United States Patent
Elboim

(10) Patent No.: US 8,443,126 B2
(45) Date of Patent: May 14, 2013

(54) HOT PLUG PROCESS IN A DISTRIBUTED INTERCONNECT BUS

(75) Inventor: Yaron Elboim, Haifa (IL)

(73) Assignee: Wilocity, Ltd., Caesarea (IL)

( * ) Notice: Subject to any disclaimer, the term of this patent is extended or adjusted under 35 U.S.C. 154(b) by 227 days.

(21) Appl. No.: 12/887,833

(22) Filed: Sep. 22, 2010

(65) Prior Publication Data

US 2012/0072633 A1    Mar. 22, 2012

(51) Int. Cl.
G06F 13/00 (2006.01)
G06F 13/36 (2006.01)

(52) U.S. Cl.
USPC .......................................... 710/302; 710/314

(58) Field of Classification Search .................. 710/302, 710/314
See application file for complete search history.

(56) References Cited

U.S. PATENT DOCUMENTS

| | | | |
|---|---|---|---|
| 7,058,738 B2 | 6/2006 | Stufflebeam, Jr. | |
| 7,257,659 B2 | 8/2007 | Martin et al. | |
| 7,475,178 B2 | 1/2009 | Rubin et al. | |
| 7,506,087 B2 * | 3/2009 | Ho et al. | 710/104 |
| 7,603,500 B2 * | 10/2009 | Brahmaroutu | 710/104 |
| 7,689,751 B2 * | 3/2010 | Feehrer | 710/301 |
| 7,814,254 B2 * | 10/2010 | Abumi | 710/302 |
| 2007/0136504 A1 | 6/2007 | Wu | |
| 2007/0271404 A1 * | 11/2007 | Dearth et al. | 710/302 |
| 2008/0046624 A1 * | 2/2008 | Rubin et al. | 710/302 |
| 2008/0162764 A1 * | 7/2008 | Tang | 710/267 |
| 2008/0307143 A1 | 12/2008 | Lin | |
| 2009/0024782 A1 | 1/2009 | Elboim | |
| 2009/0292854 A1 * | 11/2009 | Khoo | 710/312 |
| 2011/0072168 A1 * | 3/2011 | Zhao et al. | 710/14 |
| 2011/0072182 A1 * | 3/2011 | Suzuki | 710/302 |
| 2011/0145655 A1 * | 6/2011 | Erickson et al. | 714/43 |

OTHER PUBLICATIONS

PCI Express (TM) Base Specification Revision 1.0a, sections 6.7, 7.8.9, 7.8.10, and 7.8.11 published on Apr. 15, 2003, by the PCI-SIG.

* cited by examiner

Primary Examiner — Paul R Myers
Assistant Examiner — Christopher a Daley
(74) Attorney, Agent, or Firm — Myers Wolin, LLC

(57) ABSTRACT

A distributed PCIe adapted to support a hot-plug process triggered by any change in a status of a distributed link, comprises an upstream bus unit including a first bridge connected to a root component and adapted to maintain a first configuration space and a copy of a second configuration space, the first configuration space bridge includes at least hot-plug registers specifying at least capabilities and status of a slot of the first bridge; and a second bridge connected to an endpoint component and adapted to maintain the second configuration space, the second configuration space includes at least hot-plug registers specifying at least capabilities and status of a slot of the second bridge.

20 Claims, 5 Drawing Sheets

HOT PLUG PROCESS IN A DISTRIBUTED INTERCONNECT BUS

TECHNICAL FIELD

The present invention generally relates to hot-plug processes, and more particularly, for enabling a hot-plug process in a distributed interconnect bus.

BACKGROUND OF THE INVENTION

Peripheral Component Interconnect Express (PCI Express or PCIe) is a high performance, generic and scalable system interconnect for a wide variety of applications ranging from personal computers to embedded applications. PCIe implements a serial, full duplex, multi-lane, point-to-point interconnect, packet-based, and switch based technology. Current versions of PCIe buses allow for a transfer rate of 2.5 Giga bit per second (Gbps) or 5 Gbps, per lane, with up to 32 lanes. The PCIe bus protocol communication is encapsulated in packets. The packetizing and depacketizing data and status-message traffic is handled by the transaction layer of a PCIe port.

PCIe is used as a motherboard-level interconnect and an expansion board interface for add-in cards. For example, as illustrated in FIG. 1, a PCIe bus 100 interconnects the card 110 to the motherboard 120 and further connects expansion cards 130 and 140 through a host 160. The host 160 is connected to the motherboard 120. Thus, the PCIe bus 100 allows connectivity between the various cards to a CPU sub system 170 of the computing device. An expansion card is typically inserted into a slot. Usually, the host and/or the motherboard are referred to as PCIe roots and the cards are PCIe endpoints. An internal memory 180 is also coupled to the motherboard 120.

As illustrated in FIG. 2, the PCIe is a layered protocol bus, consisting of a transaction layer 210, a data link layer 220, and a physical layer 230. The PCIe implements split transactions, i.e., transactions with request and response separated by time, allowing the link to carry other traffic while the target device gathers data for the response. With this aim, the primary function of the transaction layer 210 is to assemble and disassemble transaction layer packets (TLPs). TLPs are used to carry transactions, where each TLP has a unique identifier that enables a response directed at the originator. The data link layer 220 acts as an intermediate between the transaction layer 210 and the physical layer 230 and provides a reliable mechanism for exchanging TLPs. The data link layer 220 implements error checking (known as "LCRC") and retransmission mechanisms. LCRC and sequencing are applied on received TLPs and if an error is detected, a data link retry is activated. The physical layer 230 consists of an electrical sub-layer 234 and logical sub-layer 232. The logical sub-layer 232 is a transmitter and receiver pair implementing symbol mapping, serialization, and de-serialization of data. At the electrical sub-layer 234, each lane utilizes two unidirectional low-voltage differential signaling (LVDS) pairs for transmitting and receiving symbols from the logical sub-block 232.

Although the cards are physically connected to the motherboard, the PCIe bus protocol supports a hot-plug process, i.e., replacing system components without shutting down the power. This feature is highly important in blade servers where cards are frequently removed and inserted without powering on/off the server. A hot-plug process is supported in a current implementation of the PCIe buses and controllers. The PCIe standard defines a Slot Capabilities Register, Slot Control Register, and Slot Status Register to support the hot-plug process. These registers and the standard hot-plug process are described in detail in the PCI Express™ base Specification reversion 1.0a, sections 6.7, 7.8.9, 7.8.10, and 7.8.11 published on Apr. 15, 2003, by the PCI-SIG. The relevant sections are incorporated herein by reference in their entirety merely for the useful understanding of the background of the invention.

Generally, the Slot Capabilities Register identifies specific capabilities of a PCIe slot. With regard to a hot-plug, the Slot Capabilities Register includes several bits, two of which are: Hot-Plug Surprise bit that indicates that a card in a designated slot can be removed without any prior notification and Hot-Plug Capable bit that indicates that a designated slot is capable of supporting hot-plug operations. The Slot Control Register includes bits, that when set, define if a hot-plug interrupt can be asserted, e.g., if a power fault or a presence of card in the slot is detected. The Slot Status Register provides information about slot specific parameters, e.g., if a power fault or a presence of the card is detected. These registers will be referred to hereinafter as "Hot-Plug Registers" or "HPR".

The hot-plug operation as currently implemented includes generating an interrupt when the slot status changes, i.e., from connected to disconnected and vice versa. The operating system (OS) captures the interrupt and allocates/reallocates resources to the inserted/removed device. Typically, when a card is inserted the OS enumerates the card in the order it appears on the PCIe bus.

Another type of interconnect bus that recently has been developed is a distributed interconnect bus, for example, a distributed PCIe bus. A distributed interconnect bus connects the root to endpoints over a distributed medium, e.g., a wireless medium, a computer network, and the like. The distributed interconnect bus includes two bridges that implement the PCIe protocol. A first bridge is coupled to the root and a second bridge is connected to an endpoint. The first and second bridge communicate over the distributed medium. An example of a distributed bus can be found in US Patent Application Publication No. 2009/0024782, entitled "Distributed Interconnect Bus Apparatus," assigned to the common assignee, and incorporated herein by reference in its entirety merely for the useful understanding of the background of the invention.

Due to the physical nature of the distributed medium, the connectivity between the endpoints and the root is unreliable. For example, the wireless link may frequently be idle for a short period of time, and then operational again. Such an event may be treated as a hot-plug event (i.e., a card is removed and inserted). However, the above-referenced standard defines the hot-plug process in a standard PCIe bus where the root and endpoints are physically coupled to the bus, and the connectivity medium is entirely integrated in the computing device (e.g., server or PC). There is no a solution in the related art that provides a hot-plug process in computing systems that include distributed interconnect buses. Data transfers between the root and endpoint(s) are performed by encapsulating the TLPs in data structures compliant with the distributed medium. Further, the signaling definitions and protocol of a standard PCIe do not apply for communication over the distributed medium. Thus, if a bridge coupled to the endpoint generates a hot-plug interrupt signal, the signal cannot be transferred to the root (which informs the OS).

Therefore, it would be advantageous to provide a solution to support a hot-plug process in distributed interconnect buses.

SUMMARY OF THE INVENTION

Certain embodiments of the invention include a method of a hot-plug removal in a distributed peripheral component interconnect express (PCIe) bus, the PCIe bus includes an upstream bus unit connected to a root component and a second bridge connected an endpoint component, the upstream bus unit and the second bridge communicate over a distributed link. The method comprises copying a second configuration space from the second bridge to the upstream bus unit when the distributed link is available; checking by the root component if the distributed link is unavailable; asserting a hot-plug interrupt, by the copy of the second configuration space in the upstream bus unit, if the distributed link is unavailable, the hot-plug interrupt indicates a hot-plug event; and accessing the configuration space of the second bridge stored in the upstream bus unit during a hot-plug removal process performed by an operating system (OS).

Certain embodiments of the invention further include a method of a hot-plug insertion in a distributed peripheral component interconnect express (PCIe) bus, the distributed PCIe bus includes an upstream bus unit connected to a root component and a second bridge connected to an endpoint component, the upstream bus unit and the second bridge communicate over a distributed link. The method comprises upon establishment of the distributed link, copying a second configuration space of the second bridge from the upstream bus unit to the second bridge; updating a first configuration space of a first bridge included in the upstream bus unit and the second configuration space on a hot-plug insertion event indicating that the distributed link transmits from an unavailable to an available state; asserting a hot-plug interrupt by a copy of the second configuration space in the upstream bus unit if the distributed link is available, the hot-plug interrupt informing on a hot-plug insertion event; and accessing the second configuration space stored in the second bridge during a hot-plug insertion process performed by an operating system (OS).

Certain embodiments of the invention also include a distributed PCIe adapted to support a hot-plug process triggered by any change in a status of a distributed link. The bus comprises an upstream bus unit including a first bridge connected to a root component and adapted to maintain a first configuration space and a copy of a second configuration space, the first configuration space bridge includes at least hot-plug registers specifying at least capabilities and status of a slot of the first bridge; and a second bridge connected to an endpoint component and adapted to maintain the second configuration space, the second configuration space includes at least hot-plug registers specifying at least capabilities and status of a slot of the second bridge.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
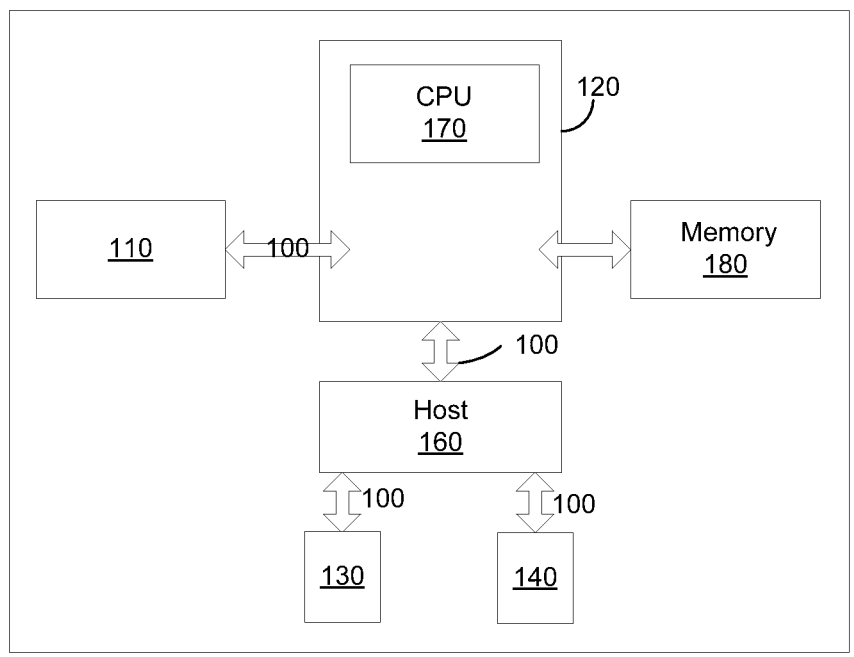
FIG. 1 is a diagram illustrating a PCIe bus connectivity.
Figure 2:
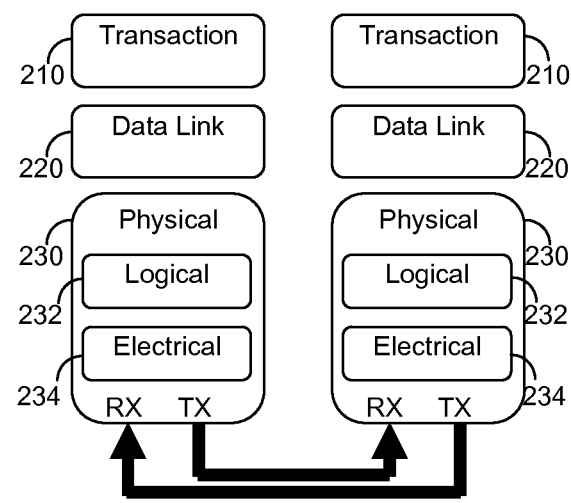
FIG. 2 is a schematic diagram illustrating the operation of a PCIe protocol.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
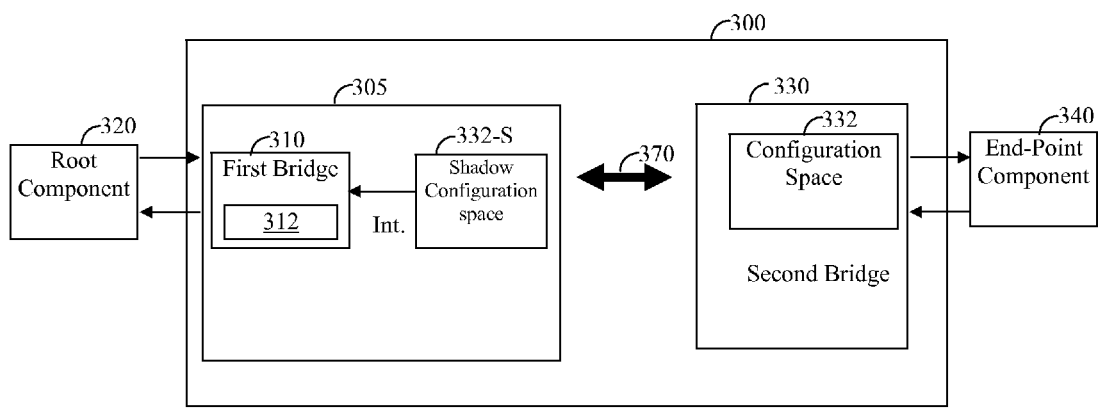
FIG. 3 is a block diagram of a distributed interconnect bus apparatus utilized to describe the embodiments of the invention.

FIG. 3 shows a non-limiting and exemplary diagram of a distributed interconnect bus apparatus 300 utilized to describe the embodiments of the invention. The apparatus 300 comprises an upstream bus unit 305 that includes a first bridge 310 connected to a root component 320 and a second bridge 330 connected to an endpoint component 340. The upstream bus unit 305 and bridge 330 communicate over a link 370 which is the distributed medium used to transfer the data between the components 320 and 340. The medium may be, but is not limited to, a wireless medium, a copper cable, a fiber optic, and so on.

The interconnect bus apparatus 300 forms a distributed bus for transferring data between remote peripheral devices connected to endpoint component 340 and a motherboard connected to the root component 320. The transport protocol used to carry data over the link 370 is defined according to the type of the medium. For example, the transport protocol may be, but is not limited to, IEEE 802.11x (Wi-Fi), Ethernet, Infiniband, and the like.

In accordance with an embodiment of the invention, the root component 320 may be either a PCIe root or a PCIe switch; the endpoint component 340 is a PCIe endpoint, and the bridges 310 and 330 are PCIe bridges. Thus, according to this embodiment the root component 320 and first bridge 310 communicate by means of the PCIe protocol, and the communication between the endpoint component 340 and the second bridge 330 is similar. However, as mentioned above the communication over the link 370 is not compliant with the PCIe protocol.

In accordance with the principles of the invention, a hot-plug process should be performed when the link 370 transits from an operational state to an idle state (up/down) and vice versa. The root component 320 should receive a hot-plug indication on such events to inform the OS of the changes that occurred at the other end of the bus. The OS correctly handles the hot-plug events to avoid crashes in the computing device and the software which is associated with it.

The second bridge 330 implements a configuration space 332 that includes the hot-plug registers (HPR). A configuration space includes a setting for performing auto configuration of an endpoint connected to a slot of a bridge. Each of bridges 310 and 330 maintains its configuration space that includes at least the HPR described above, i.e., the capabilities and status of the slot. It should be noted that the structure of the configuration space is similar to all bridges, but the content of which may be different. In an embodiment of the invention, the HPR includes Slot Control Register, Slot Status Register, and Slot Capabilities Register described above.

In accordance with an embodiment of the invention, the configuration space 332 of the second bridge 330 is shadowed in the upstream bus unit 305. That is, an exact copy of the configuration space 332 is copied and saved in the upstream bus unit 305. The shadow configuration space in the upstream bus unit 305 is labeled as 332-S. Whenever the content of the configuration space 332-S and more specifically the status of the HPR is changed, a newer version of the shadow configuration space 332-S is saved in the upstream bus unit 305. In an embodiment of the invention, the shadow configuration space of 332-S is updated using a configuration write packet generated by the second bridge 330. This provides the root component 320, and hence the OS an access the most updated configuration space of a device connected to the endpoint component 340. The first bridge 310 also maintains its configuration space 312.

When the link 370 becomes unavailable or unreliable, and transmission over the link 370 (for example, due to high bit error rate) cannot be guaranteed, the shadow configuration space 332-S asserts a hot-plug interrupt indicating the endpoint component 340 has been removed. Further, the root component 320 updates the HPR in configuration space 332-S on the status of the hot-plug events. The OS executed over the CPU accesses the HPR to read the hot-plug events and deallocates resources of a device connected to the endpoint component 340. For example, the values of the "presence detect status" and "presence detect changed" in the Slot Status Register is read.

It should be appreciated that as the OS can read status information from the shadowed configuration space 332-S, actions related to a card removal can be performed without any errors. Further, the OS always has a complete and updated status of the distributed PCIe bus. Without having the shadow configuration space 332-S, the OS would have tried accessing to the second bridge 330 to write/read to the configuration space. However, as the link 370 is idle such information would not be accessible. This would result in an OS error and a crash of the computing device.

When the link 370 is reconnected and the PCIe connection is reestablished, it is considered a hot-plug event of a hot card insertion. In such an event, the upstream bus unit 305 copies the shadow configuration space 332-S to the bridge 330, updates the HPR in the configuration space 312 of the first bridge 310 and the shadow configuration space 332-S. In addition, the shadow configuration space 332-S asserts a hot-plug interrupt to the OS. Specifically, a signal is transferred from the configuration space 332-S to the root component 320 through the upstream bus unit 305. It should be appreciated that copying the shadow configuration space 332-S provides coherency between the two bridges and allows the OS to resume communication with the endpoint component 340 without the need to reconfigure the fields of the configuration space 332 of the second bridge 330.

It should be noted that for the sake of simplicity and without limiting the scope of the invention, the operation of the hot-plug process has been described with a reference to an embodiment where only one endpoint component is connected to the second bridge 330. The teachings of the invention are similar when multiple endpoint components are connected. In such an embodiment, the configuration space respective of each bridge that supports each endpoint component is shadowed to the shadow configuration space 332-S.

Figure 4:
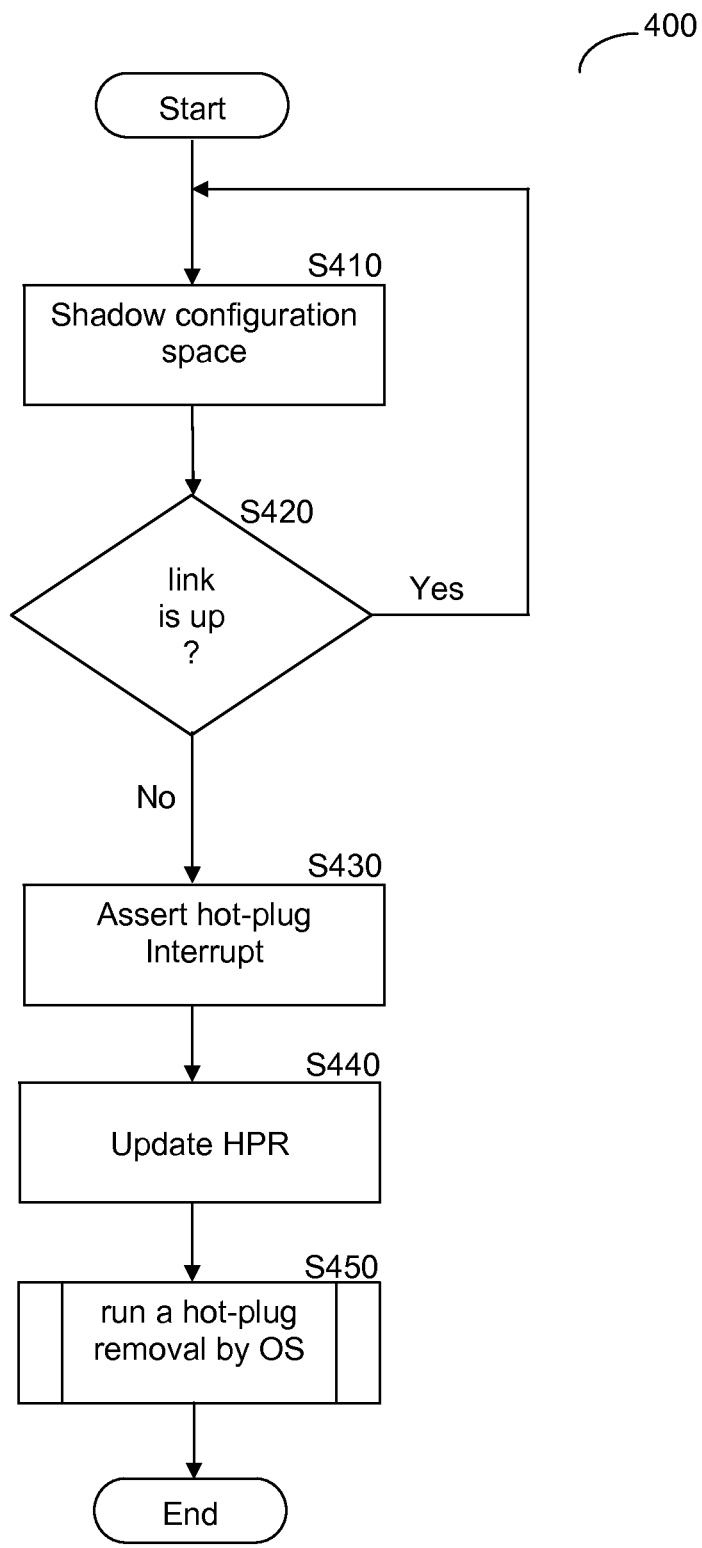
FIG. 4 is a flowchart illustrating a hot-plug removal method in a distributed PCIe bus in accordance with an embodiment of the invention.

FIG. 4 shows an exemplary and non-limiting flowchart 400 illustrating the process of a hot-plug removal in a distributed PCIe bus in accordance with an embodiment of the invention. A hot-plug removal is performed when the data cannot be transferred over the link of the distributed medium (e.g., link 370). At S410, as long as the link is available, a second bridge (e.g., bridge 330) is connected to an endpoint of the distributed PCIe, and the configuration space of the second bridge is shadowed to an upstream bus unit 305 connected to the root component 320. That is, the configuration space from the second bridge is copied to the upstream bus unit 305 forming a shadow configuration at the upstream bus unit 305 and any subsequent changes are written to the shadow configuration space. As mentioned above, the configuration space includes HPR that provide at least the bridge's slot status and capabilities.

At S420, a check is made to determine if data can be transferred over the link, i.e., if the link is available. In an embodiment of the invention, this check is performed by the root component. If S420 results with an affirmative answer, execution returns to S410; otherwise, execution continues with S430, where a hot-plug interrupt is asserted by the shadow configuration space 332-S. The interrupt indicates a hot card removal event. At S440, the HPR in the shadow configuration space 332-S is updated with the status of the hot-plug event. At S450, the OS performs a hot-plug removal process during which, the OS reads and writes to the shadow configuration space 332-S. The process executed by the OS is based on the type of the OS. For example, a hot-plug process performed by Windows based OS includes, in part, reading the hot-plug status bits from the Slot Status Register, requesting a plug-and-play system to eject the device connected to the endpoint, querying drivers for functions of the device, unloading the drivers of the device, writing to the shadow configuration space to turn off the device, and de-allocating resources used by driver(s).

As can be understood from the above example, if the OS cannot access the configuration space of the second bridge, a system error would be generated. Thus, providing an updated shadow configuration space allows performing a hot-plug removal in a distributed PCIe bus.

Figure 5:
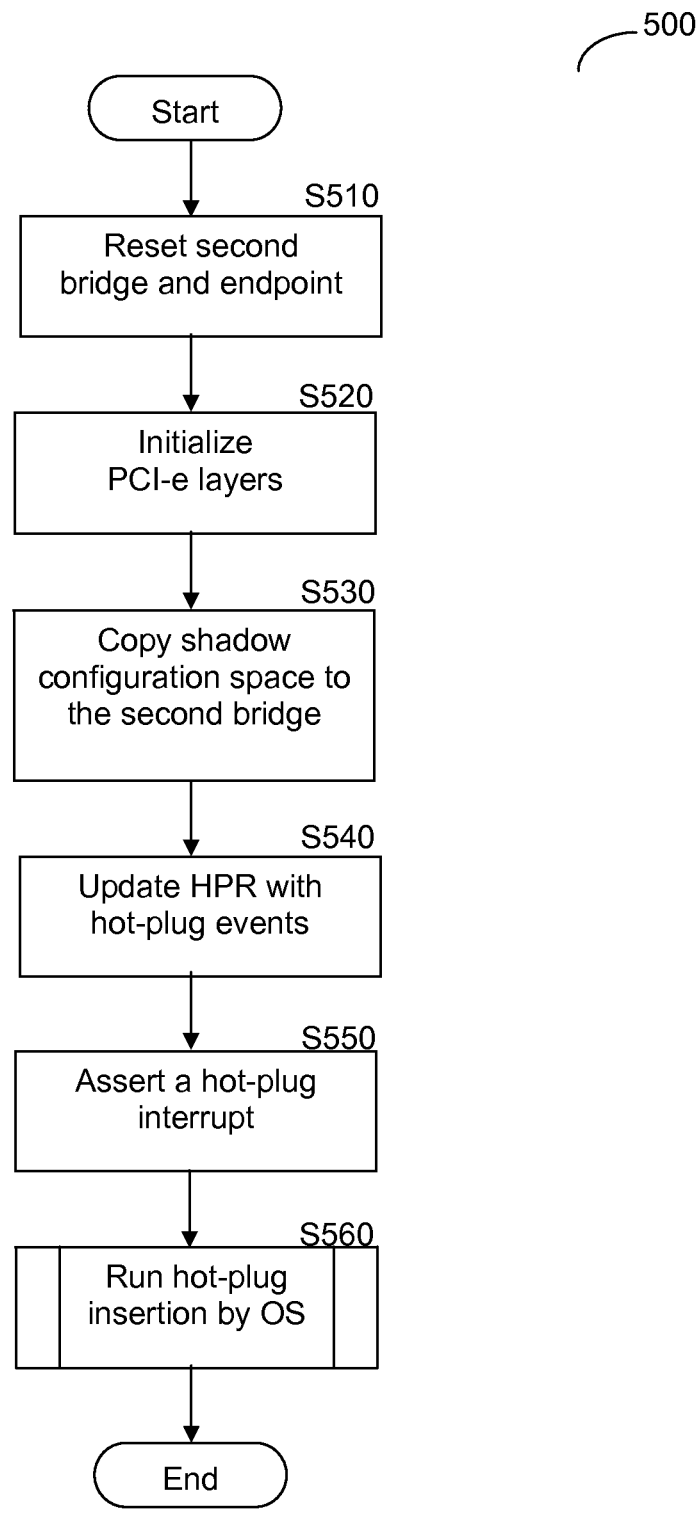
FIG. 5 a flowchart illustrating a hot-plug insertion method in a distributed PCIe bus in accordance with an embodiment of the invention.

FIG. 5 shows an exemplary and non-limiting flowchart 500 illustrating the hot-plug insertion method in a distributed PCIe bus in accordance with an embodiment of the invention. The hot-plug insertion process is initiated when the data can be transferred over the link of the distributed medium (e.g., link 370), and the link is established. At S510, upon establishment of the distributed link, the second bridge and the endpoint connected thereon are reset. Then, at S520, execution waits for the initialization of the PCIe PHY and link layers of the second bridge and endpoint.

At S530, the shadow configuration space 332-S is copied from the upstream bus unit 305 connected to the root to the second bridge 330. At S540, each bridge updates the HPR to represent a hot-plug insertion event. At S550, a hot-plug interrupt is asserted by the shadow configuration space 332-S informing the OS of the hot-plug event. To start the communication over the distributed PCIe bus, the bridges 310 and 320 wait for the OS to complete the handling of the interrupt. At S560, the OS performs a hot-plug insertion process during which it reads and writes to the configuration space of the second bridge (i.e., to a recent copy of the shadow configuration space). The process executed by the OS is based on the type of the OS. For example, a hot-plug insertion process in a Windows based OS includes, in part, reading hot-plug status bits from the Slot Status Register to determine the type of the hot-plug event, enumerating the PCIe bus to include the endpoint, reading from the configuration space 332 of the second bridge 330 in order to identify the device connected to the endpoint and perform the proper initialization actions (e.g., memory allocation, driver loading, etc.), writing to configuration space at the second bridge to turn on the device, and asserting a message that communication with the device connected to the endpoint can start.

As can be understood from above example, the ability to provide an updated copy of the configuration space at the second bridge allows immediately establishing the distributed PCIe bus. Thus, there is no need to re-configure the configuration space at the second bridge according to the device specification. It should be noted that as the process 500 is performed when the distributed link backs up, it is assumed that the device is still connected to the endpoint.

The principles of the invention can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. A method of supporting a hot-plug process triggered by a change in a status of a distributed peripheral component interconnect express (PCIe) bus, comprising:
    copying a second configuration space from a second bridge to an upstream bus unit when the distributed link is available;
    checking by a root component directly coupled to a first bridge included in the upstream bus unit if the distributed link is unavailable;
    if the distributed link is determined to be unavailable, asserting a hot-plug interrupt by a second configuration space indicating a hot-plug event, by copying the second configuration space to the upstream bus unit; and
    accessing the configuration space of the second bridge stored in the upstream bus unit during a hot-plug removal process performed by an operating system (OS)
    wherein the upstream bus unit including the first bridge communicates with the second bridge over the distributed link.

2. The method of claim 1, wherein the second configuration space includes at least hot-plug registers (HPR) specifying at least capabilities and status of the second bridge.

3. The method of claim 2, wherein the hot-plug registers include at least a slot control register, a slot status register, and a slot capabilities register.

4. The method of claim 3, wherein the hot-plug registers are updated using a configuration write packet.

5. The method of claim 1, wherein a new version of the second configuration space is copied to the upstream bus unit upon any change in the second configuration space.

6. The method of claim 1, wherein the hot-plug removal process performed by the operating system depends on the type of the operating system.

7. A method of supporting a hot-plug process triggered by a change in a status of a distributed peripheral component interconnect express (PCIe) bus, comprising:
    upon establishment of the distributed link, copying a second configuration space of the second bridge from the upstream bus unit to the second bridge;
    updating a first configuration space of a first bridge included in the upstream bus unit and the second configuration space on a hot-plug insertion event indicating that the distributed link transmits from an unavailable to an available state;
    asserting a hot-plug interrupt by a copy of the second configuration space in the upstream bus unit if the distributed link is available, the hot-plug interrupt informing on a hot-plug insertion event; and
    accessing the second configuration space stored in the second bridge during a hot-plug insertion process performed by an operating system (OS)
    wherein the upstream bus unit including the first bridge communicates with the second bridge over the distributed link.

8. The method of claim 7, wherein the second configuration space includes at least hot-plug registers specifying at least capabilities and status of a slot of the second bridge and the first configuration space bridge includes at least hot-plug registers specifying at least capabilities and status of a slot of the first bridge.

9. The method of claim 8, wherein the hot-plug registers include at least a slot control register, a slot status register, and a slot capabilities register.

10. The method of claim 9, wherein the hot-plug registers are updated using a configuration write packet.

11. The method of claim 1, wherein the hot-plug insertion process performed by the operating system depends on the type of the operating system.

12. A non-transitory computer readable medium having stored thereon instructions for causing one or more processing units to execute the method according to claim 7.

13. A distributed PCIe adapted to support a hot-plug process triggered by any change in a status of a distributed link, comprising:
    an upstream bus unit including a first bridge connected to a root component and adapted to maintain a first configuration space and a copy of a second configuration space,
    the first configuration space bridge includes at least hot-plug registers specifying at least capabilities and status of a slot of the first bridge; and
    a second bridge connected to an endpoint component and adapted to maintain the second configuration space,
    the second configuration space includes at least hot-plug registers specifying at least capabilities and status of a slot of the second bridge
    wherein the upstream bus unit including the first bridge communicates with the second bridge over the distributed link.

14. The distributed PCIe of claim 13, when the distributed link status changes from available to unavailable a hot-plug removal event is triggered.

15. The distributed PCIe of claim 14, wherein the second configuration space is copied to the upstream bus unit when the link is available.

16. The distributed PCIe of claim 15, wherein the second configuration space in the second bridge is updated with the hot-plug removal event.

17. The distributed PCIe of claim 16, wherein an operating system accesses the copy of the second configuration space in the first bridge during a hot-plug removal process performed by the operating system.

18. The distributed PCIe of claim 14, wherein when the distributed link status changes from unavailable to available is a hot-plug insertion event.

19. The distributed PCIe of claim 18, wherein the copy of the second configuration space is copied from the upstream bus unit to the second bridge.

20. The distributed PCIe of claim 19, wherein the operating system accesses the second configuration space in the second bridge during a hot-plug insertion process performed by the operating system.

* * * * *